(12) United States Patent
Runyon et al.

(10) Patent No.: US 11,225,211 B1
(45) Date of Patent: Jan. 18, 2022

(54) VEHICLE POWER SUPPLY BACKUP

(71) Applicants: Michael W Runyon, Wixom, MI (US); Jerome M Hendler, Jr., Rochester, MI (US)

(72) Inventors: Michael W Runyon, Wixom, MI (US); Jerome M Hendler, Jr., Rochester, MI (US)

(73) Assignee: FCA US LLC, Auburn Hills, MI (US)

( * ) Notice: Subject to any disclaimer, the term of this patent is extended or adjusted under 35 U.S.C. 154(b) by 0 days.

(21) Appl. No.: 17/001,946

(22) Filed: Aug. 25, 2020

(51) Int. Cl.
*B60R 16/033* (2006.01)
*H01M 50/20* (2021.01)

(52) U.S. Cl.
CPC .......... *B60R 16/033* (2013.01); *H01M 50/20* (2021.01); *H01M 2220/20* (2013.01)

(58) Field of Classification Search
CPC .. B60R 16/033; H01M 50/20; H01M 2220/20
See application file for complete search history.

(56) References Cited

U.S. PATENT DOCUMENTS

| | | | |
|---|---|---|---|
| 6,522,960 | B2 | 2/2003 | Nada |
| 7,489,101 | B2 | 2/2009 | Bockelmann et al. |
| 8,742,615 | B2 | 6/2014 | Gopalakrishnan et al. |
| 10,525,915 | B2 | 1/2020 | Sturza et al. |

*Primary Examiner* — Robert L Deberadinis
(74) *Attorney, Agent, or Firm* — Ralph E. Smith

(57) ABSTRACT

A vehicle power supply backup system includes a first vehicle battery, a second vehicle battery, a switch, and a controller. The first vehicle battery is configured to output electricity that has a first nominal voltage and that is used to supply electrical power to a first vehicle component. The second vehicle battery has multiple battery cells, and is configured to output electricity that has a second nominal voltage that is higher than the first nominal voltage. The switch is coupled between the first vehicle component and a designated subset of battery cells, which include one or more of the multiple battery cells of the second vehicle battery. The controller is configured so that when a backup condition of the first vehicle battery is detected, the switch is changed to the second state thereby causing the designated subset of battery cells to supply electricity to at least the first vehicle component.

20 Claims, 4 Drawing Sheets

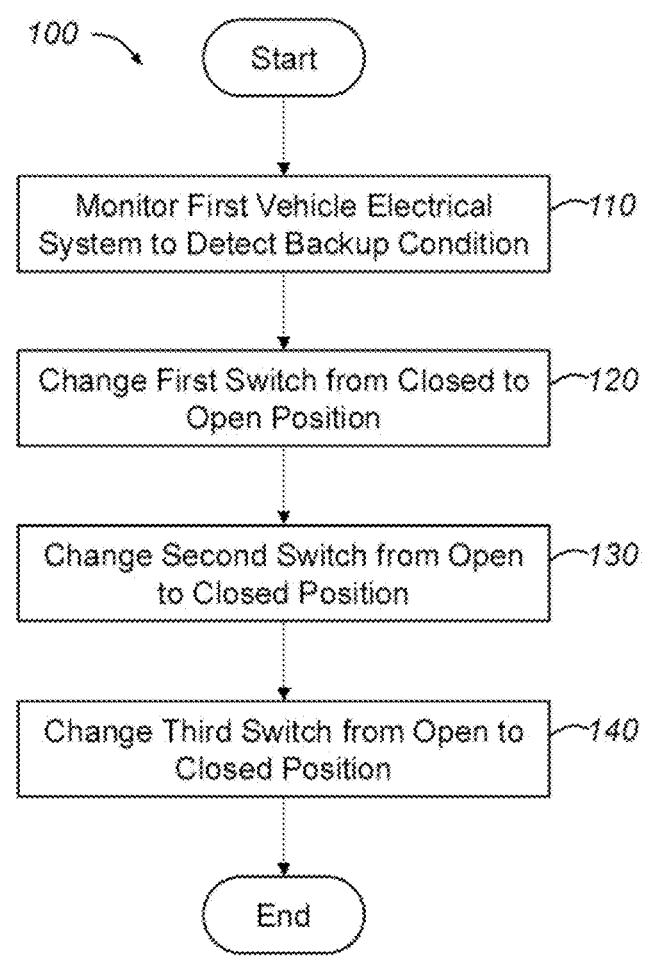

VEHICLE POWER SUPPLY BACKUP

FIELD

The present disclosure relates to providing backup power to electrical components of a vehicle.

BACKGROUND

Vehicle electrical systems, such as those used for automobiles, typically include a battery to power various electrical components of the vehicle. Conventionally, for example, automobiles include a 12 volt (12V) rechargeable battery to power various controllers, sensors, etc. Additionally, some automobiles, namely hybrid and electric vehicles, include another power source for purposes of propulsion and this power source typically comes in the form of a battery pack that provides an output voltage substantially higher than that used for powering the other electrical components.

In hybrid and electric vehicles, controllers are included for controlling the battery pack and the electric propulsion system, and these controllers are typically powered by another, lower-voltage power source, such as a 12V automotive battery, that is part of another electrical system. However, when this lower-voltage electrical system fails, such as due to a faulty battery cell or a disconnection between an electrical wire and a battery terminal, power is lost to the controllers that control the battery pack and the electric propulsion system. In such situations, some automobiles are configured to disconnect the battery pack from the propulsion motor or system of the automobile and let the automobile roll to a stop.

SUMMARY

In at least some implementations, a vehicle power supply backup system includes a first vehicle battery, a second vehicle battery, a switch, and a controller. The first vehicle battery is configured to output electricity that has a first nominal voltage and that is used to supply electrical power to at least a first vehicle component. The second vehicle battery has multiple battery cells, and is configured to output electricity that has a second nominal voltage that is higher than the first nominal voltage and that is used to supply electrical power to at least a second vehicle component. The switch has a first state and a second state, and is coupled between a designated subset of battery cells and the first vehicle component. The designated subset of battery cells are comprised of one or more of the multiple battery cells of the second vehicle battery. The controller is connected to the switch such that the controller is able to change the state of the switch, and the controller is configured so that when a backup condition of the first vehicle battery is detected, the switch is changed to the second state thereby causing the designated subset of battery cells to supply electricity to at least the first vehicle component.

In at least some implementations, the number of battery cells included in the designated subset of battery cells is selected based on a base voltage of the battery cells of the second vehicle battery and the first nominal voltage. The number of battery cells included in the designated subset of battery cells may be equal to the first nominal voltage divided by the base voltage. The designated subset of battery cells may supply electricity at a third nominal voltage that is within 10% of the first nominal voltage. The first nominal voltage may be within a range that does not overlap a range of the second nominal voltage.

In at least some implementations, the first vehicle component is a controller that controls an electric propulsion motor of a vehicle on which the system is installed, and the second vehicle component is the electric propulsion motor of the vehicle. The first nominal voltage may be less than ten percent of the second nominal voltage. The number of battery cells of the designated subset of battery cells may be less than ten percent of the total number of battery cells of the second vehicle battery.

In at least some implementations, the system further includes one or both of a first switch and a second switch, and the switch coupled between the designated subset of battery cells and the first vehicle component is a third switch. The first switch is coupled between the first vehicle battery and the first electrical component, and the second switch is coupled between the designated subset of battery cells and vehicle ground. The system may be configured so that when a backup condition of the first vehicle battery is detected, the first switch is changed to an open state thereby isolating the first electrical component from the first vehicle battery such that the first vehicle battery is not used to provide electricity to the first vehicle component. The system may be further configured so that when a backup condition of the first vehicle battery is detected, the second switch is changed to a closed state thereby coupling the designated subset of battery cells to the vehicle ground. And, the system may be configured so that when a backup condition of the first vehicle battery is detected, the first switch is changed from a closed state to the open state, then the second switch is changed from an open state to the closed state, and then the third switch is changed from the first state to the second state.

In at least some implementations, a vehicle power supply backup system includes: a first vehicle battery, a second vehicle battery, a first switch, a second switch, and a third switch. The first vehicle battery is configured to output electricity that has a first nominal voltage within a first nominal voltage range and that is used to supply electrical power to at least a first vehicle component. The second vehicle battery has multiple battery cells, and is configured to output electricity that has a second nominal voltage within a second nominal voltage range that is higher than the first nominal voltage range and that is used to supply electrical power to at least a second vehicle component. The first switch is coupled between the first vehicle battery and the first vehicle component, and has an open state and a closed state. The second switch is coupled between a designated subset of battery cells and vehicle ground, and has an open state and a closed state. The designated subset of battery cells includes one or more battery cells of the multiple battery cells of the second vehicle battery. The third switch is coupled between the designated subset of battery cells and the first vehicle component, and has an open state and a closed state. The vehicle power supply backup system is configured so that when a backup condition of the first vehicle battery is detected, the first switch is changed to the open state, the second switch is changed to the closed state, and the third switch is changed to the closed state thereby causing the designated subset of battery cells to supply electricity having a third nominal voltage within the first nominal voltage range to at least the first vehicle component.

In at least some implementations, the second switch is coupled between the vehicle ground and a negative terminal of a first one of the one or more battery cells of the designated subset of battery cells. The third switch may be coupled between the designated subset of battery cells and a positive terminal of a second one of the one or more battery cells of the designated subset of battery cells. The one or more battery cells of the designated subset of battery cells may include the first one of the battery cells, the second one of the battery cells, and at least one other battery cell that is connected in a serial fashion between the first one and the second one of the battery cells.

In at least some implementations, a method of providing backup power to an electrical component of a first vehicle electrical system includes detecting a backup condition of a first vehicle battery of the first vehicle electrical system and in response to detecting the backup condition of the first vehicle battery, causing a second vehicle battery to provide electricity to the electrical component. The causing step includes changing a first switch from a closed state to an open state, changing a second switch from an open state to a closed state, and changing a third switch from an open state to a closed state. The first switch is provided along an electrical path between the first vehicle battery and the electrical component. The second switch is provided along an electrical path between a designated subset of battery cells and vehicle ground. The third switch is provided along an electrical path between the designated subset of battery cells and the electrical component.

In at least some implementations, the changing the first switch step is carried out before the changing the second switch step. In at least some implementations, the backup condition of the first vehicle battery is a failure condition of the first vehicle battery.

Further areas of applicability of the present disclosure will become apparent from the detailed description, claims and drawings provided hereinafter. It should be understood that the summary and detailed description, including the disclosed embodiments and drawings, are merely exemplary in nature intended for purposes of illustration only and are not intended to limit the scope of the invention, its application or use. Thus, variations that do not depart from the gist of the disclosure are intended to be within the scope of the invention.

BRIEF DESCRIPTION OF THE DRAWINGS

FIG. 4 is a flowchart depicting a method of providing backup power to an electrical component of a first vehicle electrical system.

DETAILED DESCRIPTION

Figure 1:
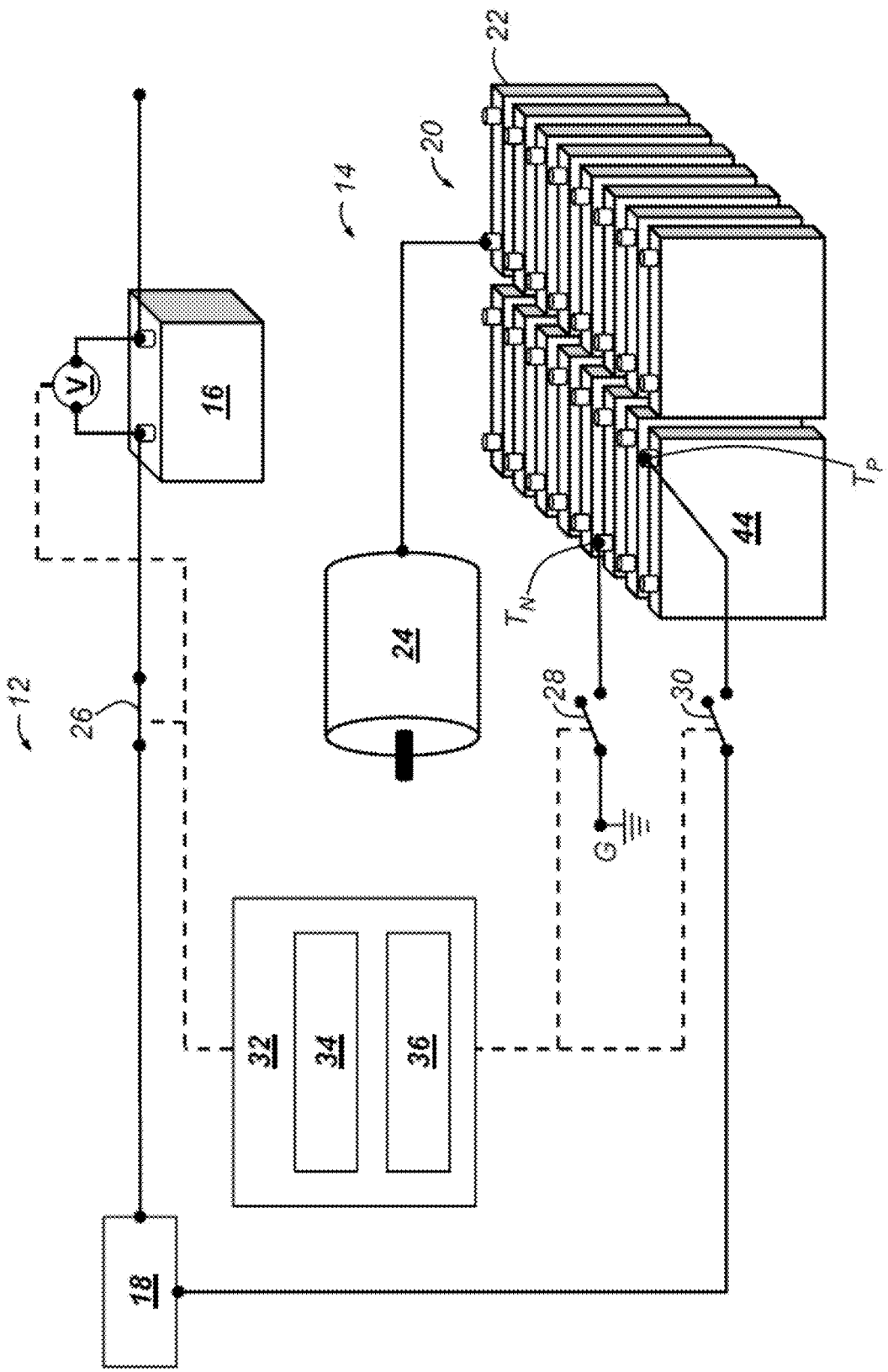
FIG. 1 is a diagrammatic view of a vehicle power supply backup system in a normal operating state.
Figure 2:
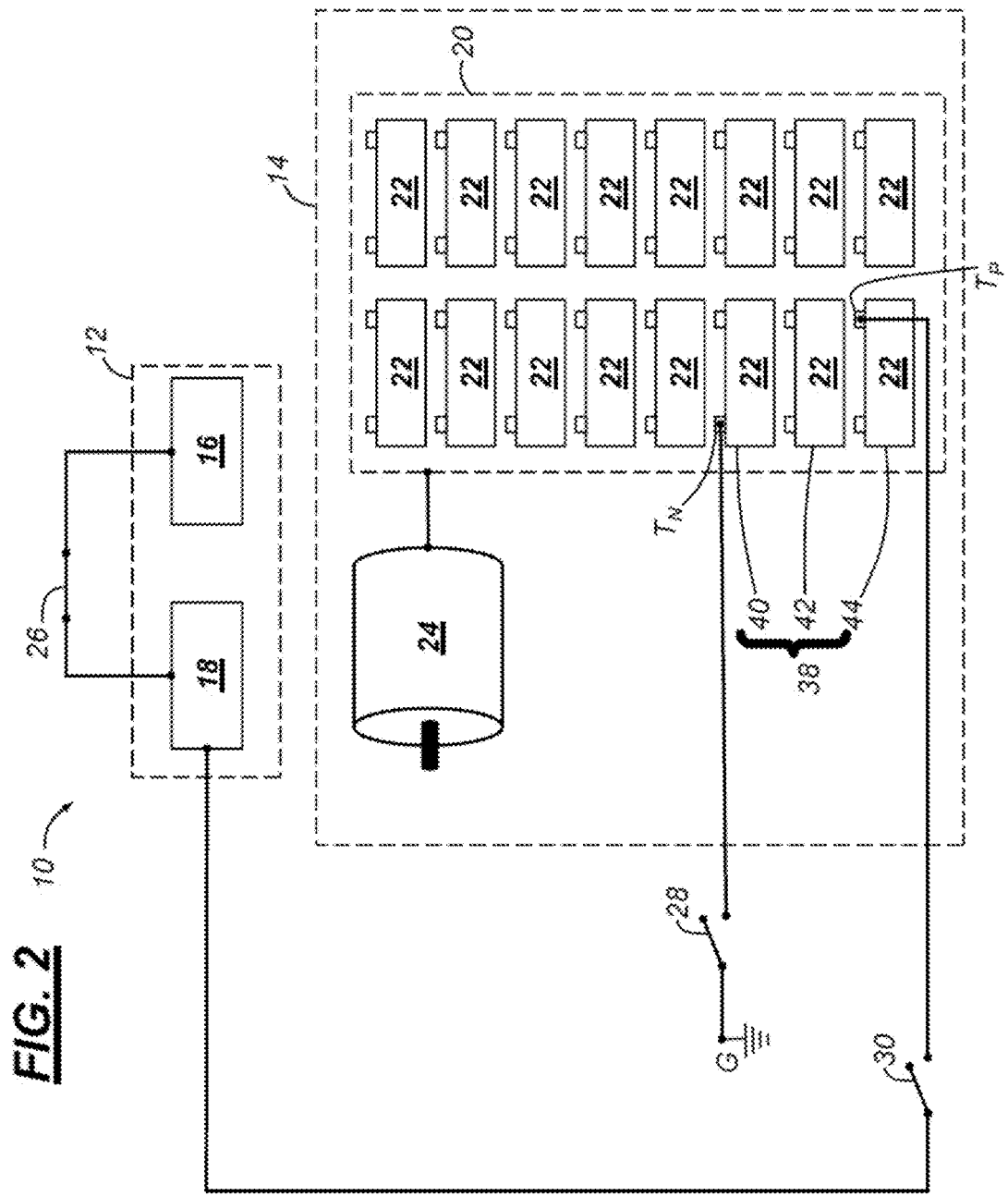
FIG. 2 is a diagrammatic view of at least a portion of the vehicle power supply backup system in the normal operating state.
Figure 3:
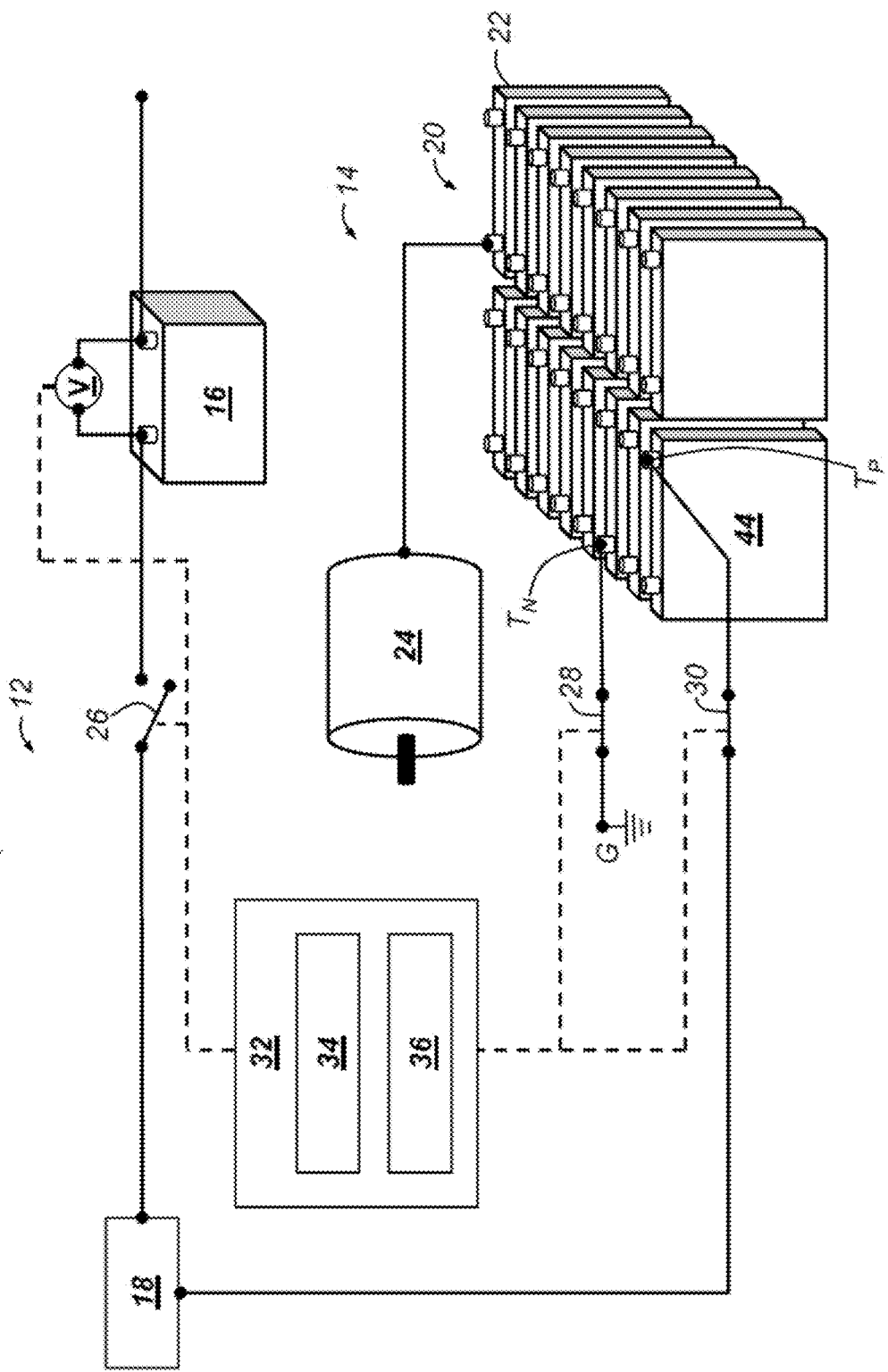
FIG. 3 is a diagrammatic view of the vehicle power supply backup system in a backup operating state.

Referring in more detail to the drawings, FIGS. 1-3 depict a vehicle power supply backup system 10 that is configured to provide backup power to at least one vehicle component that is normally powered by a first vehicle electrical system 12. The system 10 generally includes the first vehicle electrical system 12 and a second vehicle electrical system 14. The first vehicle electrical system 12 includes a first vehicle battery 16 and one or more electrical components 18 that are powered by the first vehicle battery 16 during normal operation or when the system 10 is in the normal operating state.

The first vehicle battery 16 is configured to output electricity that has a first nominal voltage within a first nominal voltage range. The first vehicle battery 16 can be any of a variety of rechargeable vehicle batteries, including a lead-acid battery, nickel-hydride battery, or a lithium-ion battery, for example. The first vehicle battery 16 may include any suitable number of battery cells (not shown), such as, for example, six battery cells or twelve battery cells. For example, the first vehicle battery 16 may be an automotive 12V, 40 Ah lead-acid battery that includes six battery cells and that provides a nominal voltage of 12V. In one embodiment, the first vehicle electrical system 12 is a low-voltage vehicle electrical system, which is a vehicle electrical system that includes vehicle electrical components powered by a power source operating at a nominal voltage of less than 80V. In such an embodiment, for example, the first vehicle battery 16 may provide a nominal voltage of 12V, 24V, or 48V for purposes of powering the electrical component(s) 18 of the first vehicle electrical system 12.

The electrical component(s) 18 may include any electrical components installed as a part of the vehicle electronics and that are powered by the first vehicle battery 16. As shown in FIGS. 1-2, in the normal operating state, the electrical component(s) 18 are electrically coupled to the first vehicle battery 16 as indicated by the solid black lines. In one embodiment, the electrical component(s) 18 include an electronic controller that controls the second vehicle battery 20 and/or an electronic controller that controls an electric propulsion system of the vehicle, such as those that are installed in hybrid and electric vehicles. The electrical component(s) 18 may also or alternatively include other controllers, vehicle sensors, vehicle lights, vehicle human-machine interfaces (e.g., electronic displays, audio speakers), etc.

The second vehicle electrical system 14 includes a second vehicle battery 20 in the form of a battery pack having multiple battery cells 22 and also includes one or more electrical components 24 that are powered by the second vehicle battery 20. The second vehicle battery 20 is configured to output electricity that has a second nominal voltage within a second nominal voltage range that, in at least one embodiment, is higher than the first nominal voltage range. The second vehicle battery 20 may be any suitable type of battery. Each battery cell 22 provides a nominal amount of voltage referred to herein as a base voltage. In one embodiment, the base voltage of each of the multiple battery cells 22 is the same, such as, for example, 1.5V. However, in other embodiments, the base voltage of different ones of the multiple battery cells 22 differs.

It should be appreciated that, in FIGS. 1-3, illustration of the connections between the multiple battery cells 22 have been omitted; however, it should be appreciated that adjacent battery cells can be connected to each other in any suitable manner, such as in a serial fashion (e.g., the negative terminal of a first battery cell is connected to the positive terminal of a second, adjacent battery cell). According to various embodiments, serial and parallel connections between adjacent battery cells or subsets of battery cells can be used, as the precise arrangement and manner in which the multiple battery cells 22 are connected or arranged may depend on the particular application in which the system 10 is used.

In one embodiment, the second vehicle electrical system 14 is a high-voltage vehicle electrical system, which is a vehicle electrical system that includes vehicle electrical components powered by a power source operating at a nominal voltage of at least 80V. In such an embodiment, for example, the second vehicle battery 20 may provide a nominal voltage of 400V so as to power the electrical component(s) 24 of the second vehicle electrical system 14.

The electrical component(s) 24 may include any electrical components installed as a part of the vehicle electronics and that are powered by the second vehicle battery 20. In the illustrated embodiment, the electrical component(s) 24 include an electric propulsion motor of the vehicle, such as those that are installed in hybrid and electric vehicles. As shown in FIGS. 1-2, the electrical component(s) 24 are electrically coupled to the second vehicle battery 20 as indicated by the solid black line.

According to one embodiment, the first vehicle electrical system 12 operates to provide an output voltage that is less than that of the second vehicle electrical system 14; for example, the first vehicle electrical system 12 operates at 12V provided by the first vehicle battery 16 and the second vehicle electrical system 14 operates at 400V provided by the second vehicle battery 20. According to some embodiments, the first vehicle electrical system 12 provides a nominal voltage within a first nominal voltage range and the second vehicle electrical system 14 provides a nominal voltage within a second nominal voltage range that is greater than and does not overlap the first nominal voltage range. For example, the first vehicle electrical system 12 provides a nominal voltage within a range of 3V to 100V and the second vehicle electrical system 14 provides a nominal voltage within a range of 150V to 500V.

The vehicle power supply backup system 10 may include a first switch 26, a second switch 28, and a third switch 30, each of which is controllable to and between an open state and a closed state. In one embodiment, an electronic controller 32 is used to control each of the switches 26, 28, 30, which can be performed through sending an electrical signal that causes the switch to change from the open state to the closed state or vice versa. The electronic controller 32 is depicted as including a processor 34 and memory 36. It should be appreciated that any suitable electronic device may be used, such as application specific integrated circuits (ASICs), field-programmable gate arrays (FPGAs), etc. In one embodiment, the memory 36 stores computer instructions that, when executed by the processor 34, cause one or more steps of the method discussed below to be carried out. Also, although a single electronic controller 32 is shown and described as controlling the switches 26, 28, 30 as indicated by the dashed lines, it should be appreciated that, according to other embodiments, two or more electronic controllers may be used to control the switches 26, 28, 30.

In general, the switches 26, 28, 30 are used to prevent electricity from flowing from the first vehicle battery 16 to the electrical component(s) 18 and to cause electricity to flow from a designated subset of battery cells 38 of the second vehicle battery 20 to at least one of the electrical component(s) 18. The designated subset of battery cells 38 includes one or more of the battery cells 22 of the second vehicle battery 20 and, in the illustrated embodiment, is shown as including three battery cells 40, 42, 44. As will be discussed more below, the switches 26, 28, 30 are switched in response to determining that one or more conditions, such as one or more failure conditions, of the first vehicle battery 16 are present within the first vehicle electrical system 12.

FIGS. 1-2 depict the system 10 when operating in a normal operating state and FIG. 3 depicts the system 10 when operating in a backup operating state. It should be appreciated that FIGS. 1-3 are diagrammatic and do not purport to show entire circuits. Moreover, the electrical connection between the first vehicle battery 16 and the electrical component(s) 18 is separate from the electrical connection between the electrical component(s) 18 and the designated subset of battery cells 38. Thus, the electrical component(s) 18 are only connected to one of either the first vehicle battery 16 or the designated subset of battery cells 38, but not both.

As shown in FIGS. 1-2 of the illustrated embodiment, in the normal operating state: (i) the first switch 26 is in the closed state so as to permit the first vehicle battery 16 to provide electricity to the electrical component(s) 18; (ii) the second switch 28 is in the open state; and (iii) the third switch 30 is in the open state. In the normal operating state, the designated subset of battery cells 38 provide electricity to the electrical component(s) 24 of the second vehicle electrical system 14. In the backup operating state, the designated subset of battery cells 38 provide electricity to the electrical component(s) 18 of the first vehicle electrical system 12. In at least one embodiment, in the backup operating state, the designated subset of battery cells 38 do not provide any electricity to the electrical component(s) 24 of the second vehicle electrical system 14.

FIG. 3 depicts the system 10 when operating in a backup operating state, which is a state in which electricity of the second vehicle battery 20 is being used at least in part to power at least some of the electrical component(s) 18 of the first vehicle electrical system 12. As discussed more below, in at least some implementations, the system 10 transitions from the normal operating state to the backup operating state in response to detecting a failure of the first vehicle electrical system. As shown in FIG. 3, in the backup operating state: (i) the first switch 26 is in the open state so as to prevent the first vehicle battery 16 from providing electricity to the electrical component(s) 18; (ii) the second switch 28 is in the closed state so as to ground the designated subset of battery cells 38; and (iii) the third switch 30 is in the closed state so that the designated subset of battery cells 38 is used to provide electricity to the electrical component(s) 18 of the first vehicle electrical system 12.

The first switch 26 is an electric switch that is used to open or close an electric path between the first vehicle battery 16 and the electrical component(s) 18 of the first vehicle electrical system 12. During normal operation, the first switch 26 is in the closed state. In one embodiment, the first switch 26 is disposed along an electric path between a first, positive terminal of the first vehicle battery 16 and the electrical component(s) 18. In such an embodiment, when the first switch 26 is switched to the open state, then electricity is prevented from flowing from the first vehicle battery 16 to the electrical component(s) 18.

The second switch 28 is an electric switch that is used to open or close an electric path between the designated subset of battery cells 38 and vehicle ground G, which can include a vehicle metal frame component, for example. During normal operation, the second switch 28 is in the open state. In one embodiment, the second switch 28 is disposed along an electric path between a negative terminal $T_N$ of a first cell 40 of the designated subset of battery cells 38 and the vehicle ground G. In such an embodiment, when the second switch 28 is switched to the closed state, the first cell 40 of the designated subset of battery cells 38 is grounded.

The third switch 30 is an electric switch that is used to open or close an electric path between the designated subset of battery cells 38 and the electrical component(s) 18 of the first vehicle electrical system 12. During normal operation, the third switch 30 is in the open state. In one embodiment, the third switch 30 is disposed along an electric path between a positive terminal $T_P$ of a third cell 44 of the designated subset of battery cells 38 and the electrical component(s) 18.

In at least one embodiment, each of the switches 26, 28, 30 may be either of a single pole single throw (SPST) switch or a double pole single throw (DPST) switch operable between a closed state and an open state. In another embodiment, the switches 26 and 30 may be implemented together within a single switching unit; for example, the single switching unit can be a double throw switch (e.g., a single pole double throw (SPDT) switch, a double pole double throw (DPDT)) that includes the switches 26 and 30 and that is operable between a first state and a second state. The first state is used as a part of the normal operating state in which the first vehicle battery 16 provides electrical power to the electrical component(s) 18 and the second state is used as a part of the backup operating state in which the designated subset of battery cells 38 provides electrical power to the electrical component(s) 18. Thus, in an example where a double throw switch is used to implement both switches 26 and 30, the double throw switch electrically connects the first vehicle battery 16 to the electrical component(s) 18 when in the first state and the double throw switch electrically connects the designated subset of battery cells 38 to the electrical component(s) 18 when in the second state. With respect to the illustrated embodiment, when in the first state, the first switch 26 is in the closed state and the third switch 30 is in the open state (FIGS. 1-2), and when in the second state, the first switch 26 is in the open state and the third switch 30 is in the closed state (FIG. 3).

The electronic controller 32 monitors the first vehicle electrical system 12 to determine whether one or more conditions are present, which may include one or more backup conditions. A backup condition is a condition that, by itself or in combination with other backup condition(s), indicates that the system 10 is to be placed into the backup operating state. In one embodiment, the backup condition(s) include a failure condition in which a measured output voltage from the first battery 16 is below a particular threshold amount, which may indicate that there is a short circuit within the first vehicle electrical system 12 or that a charging system used to recharge the first vehicle battery 16 has failed, or that the battery 16 is failing or has failed. For example, the electronic controller 32 is communicatively coupled to a voltmeter V that measures a voltage across the first vehicle battery 16 and, when the measured output voltage from the voltmeter is below the threshold amount (e.g. 11.5V), then the electronic controller 32 determines that a failure condition is present, and it can be said that the electronic controller 32 detects a failure of the first vehicle electrical system 12. Other failure condition(s) or other backup condition(s) can be used as the previous example is only but one example.

It should be appreciated that, although the electronic controller 32 is described as monitoring the first electrical system 12 to determine whether one or more backup conditions are present, according to other embodiments, another electronic controller is used to carry out this functionality. Thus, it should be appreciated that any number of electronic controllers may be used to control the switches 26, 28, 30 and to detect whether one or more backup conditions are present.

With reference to FIG. 4, there is shown an embodiment of a method 100 of providing backup power to one or more vehicle components of a first vehicle electrical system. The method 100 is described below as being carried out by the vehicle power supply backup system 10 described above; however, in other embodiments, other suitable electrical systems may be used to carry out the method 100.

The method 100 begins with step 110, where the first vehicle electrical system 12 is monitored to determine whether one or more backup conditions are present. For example, in one embodiment, the backup condition(s) may be or include one or more failure conditions, such as condition(s) indicating that there is a short-circuit in the first vehicle electrical system 12, that a charging system used to charge the first vehicle battery 16 has failed, and/or that the first vehicle battery 16 is failing or has failed. In such an example, the monitoring may include comparing a measured output voltage of the first vehicle battery 16 to a threshold amount and, when the measured output voltage is below the threshold amount, it can be determined that a failure condition is present. As another example, the state of charge (SoC) of the first vehicle battery 16 is monitored by the electronic controller 32 and, when it is determined that the SoC of the first vehicle battery 16 falls below a threshold amount, it can be determined that a failure condition is present. In another embodiment, the temperature of the first vehicle battery 16 is measured and compared to a predetermined threshold temperature and, when the measured temperature of the first vehicle battery 16 is equal to or outside of the predetermined threshold temperature (e.g. higher than a threshold high temperature, or lower than a predetermined low temperature threshold), it can be determined that a backup condition is present. In an embodiment, the current of the first vehicle battery 16 may be determined and compared to threshold currents to determine if the current is outside of high or low current thresholds. The method 100 continues to step 120 when a backup condition is detected.

In step 120, the first switch 26 is changed from a closed position to an open position. The first switch 26 is disposed along an electric path between the first vehicle battery 16 and the electrical component(s) 18 of the first vehicle electrical system 12. In one embodiment, the electronic controller 32 sends a control signal to the first switch 26 that causes the first switch 26 to change from the closed position to the open position. Thus, the first vehicle battery 16 is electrically isolated from the rest of the first vehicle electrical system 12 or at least from the electrical component(s) 18 so that electrical power is prevented from being provided to the electrical component(s) 18 of the first vehicle electrical system 12 from the first vehicle battery 16. The method 100 continues to step 130.

In step 130, the second switch 28 is changed from an open position to a closed position. In one embodiment, the second switch 28 is disposed along an electric path between the negative terminal $T_N$ of the first cell 40 of the designated subset of battery cells 38 and the vehicle ground G. In one embodiment, the electronic controller 32 sends a control signal to the second switch 28 that causes the second switch 28 to change from the open position to the closed position. Thus, the designated subset of battery cells 38 are grounded to the vehicle ground G. The method 100 continues to step 140.

In step 140, the third switch 30 is changed from an open position to a closed position. In one embodiment, the third switch 30 is disposed along an electric path between the positive terminal $T_P$ of the third cell 44 of the designated subset of battery cells 38 and the electrical component(s) 18. In one embodiment, the electronic controller 32 sends a control signal to the third switch 30 that causes the third switch 30 to change from the open position to the closed position. Thus, electrical power is provided to the electrical component(s) 18 of the first vehicle electrical system 12 from the designated subset of battery cells 38 thereby providing backup power for the electrical component(s) 18. The designated subset of battery cells 38 supplies electricity having a third nominal voltage to the electrical component(s) 18. In at least one embodiment, the third nominal voltage is within the first nominal voltage range and, in one embodiment, the third nominal voltage is substantially equal to the first nominal voltage, which means that the third nominal voltage is within 10% of the first nominal voltage (e.g., if first nominal voltage is 12V and third nominal voltage is 11.5V, then the first nominal voltage is substantially equal to the third nominal voltage since 0.5V/12V<0.1). The method 100 then ends.

Thus, the method and system above enable electrical components that are normally powered by a first vehicle battery to be powered using a designated subset of battery cells of a second vehicle battery when one or more backup conditions, which may be used to indicate a failure of the first vehicle battery (or first vehicle electrical system), are detected. In one embodiment, the number of battery cells selected as being a part of the designated subset of battery cells is based on the base voltage of the battery cells of the second vehicle battery and on the nominal voltage of the first vehicle battery during normal operation. For example, the first vehicle battery may provide 12V of nominal voltage and the base voltage of each battery cell of the second vehicle battery may be 1.5V. Thus, in such an example 8 battery cells of the second vehicle battery may be selected to be a part of the designated subset of battery cells as the 8 battery cells would provide a third nominal voltage of 12V (8×1.5V=12V). By selecting the number of cells of the designated subset of battery cells in this way, other electrical devices, such as transformers, are not needed as the voltage output by the designated subset of battery cells is already at the nominal voltage.

Additionally, in at least some embodiments, the second vehicle battery is able to provide suitable electrical power to the electrical component(s) of the second vehicle electrical system even when the designated subset of battery cells are being used to power electrical component(s) of the first vehicle electrical system. This may be enabled by, for example, having the number of battery cells of the designated subset of battery cells be relatively low compared to the total number of battery cells of the second vehicle battery. In one example, the number of battery cells of the designated subset of battery cells is less than 10% of the total number of battery cells of the second vehicle battery. In another example, the number of battery cells of the designated subset of battery cells is less than 5% of the total number of battery cells of the second vehicle battery.

What is claimed is:

1. A vehicle power supply backup system, comprising:
a first vehicle battery configured to output electricity that has a first nominal voltage and that is used to supply electrical power to at least a first vehicle component;
a second vehicle battery having multiple battery cells, the second vehicle battery being configured to output electricity that has a second nominal voltage that is higher than the first nominal voltage and that is used to supply electrical power to at least a second vehicle component;
a switch coupled between a designated subset of battery cells and the first vehicle component, the designated subset of battery cells being comprised of one or more of the multiple battery cells of the second vehicle battery, and the switch having a first state and a second state; and
a controller connected to the switch such that the controller is able to change the state of the switch, wherein the controller is configured so that when a backup condition of the first vehicle battery is detected, the switch is changed to the second state thereby causing the designated subset of battery cells to supply electricity to at least the first vehicle component.

2. The system of claim 1, wherein the number of battery cells included in the designated subset of battery cells is selected based on a base voltage of the battery cells of the second vehicle battery and the first nominal voltage.

3. The system of claim 2, wherein the number of battery cells included in the designated subset of battery cells is equal to the first nominal voltage divided by the base voltage.

4. The system of claim 2, wherein the designated subset of battery cells supplies electricity at a third nominal voltage that is within 10% of the first nominal voltage.

5. The system of claim 1, wherein the first nominal voltage is within a range that does not overlap a range of the second nominal voltage.

6. The system of claim 1, wherein the first vehicle component is a controller that controls an electric propulsion motor of a vehicle on which the system is installed.

7. The system of claim 6, wherein the second vehicle component is the electric propulsion motor of the vehicle.

8. The system of claim 1, wherein the first nominal voltage is less than ten percent of the second nominal voltage.

9. The system of claim 1, wherein the number of battery cells of the designated subset of battery cells is less than ten percent of the total number of battery cells of the second vehicle battery.

10. The system of claim 1, further comprising one or both of a first switch and a second switch, wherein the switch coupled between the designated subset of battery cells and the first vehicle component is a third switch, wherein the first switch is coupled between the first vehicle battery and the first electrical component, and wherein the second switch is coupled between the designated subset of battery cells and vehicle ground.

11. The system of claim 10, wherein the system includes the first switch, and wherein the system is configured so that when a backup condition of the first vehicle battery is detected, the first switch is changed to an open state thereby isolating the first electrical component from the first vehicle battery such that the first vehicle battery is not used to provide electricity to the first vehicle component.

12. The system of claim 11, wherein the system includes the second switch, and wherein the system is configured so that when a backup condition of the first vehicle battery is detected, the second switch is changed to a closed state thereby coupling the designated subset of battery cells to the vehicle ground.

13. The system of claim 12, wherein the system is configured so that when a backup condition of the first vehicle battery is detected, the first switch is changed from a closed state to the open state, then the second switch is changed from an open state to the closed state, and then the third switch is changed from the first state to the second state.

14. A vehicle power supply backup system, comprising:
a first vehicle battery configured to output electricity that has a first nominal voltage within a first nominal voltage range and that is used to supply electrical power to at least a first vehicle component;

a second vehicle battery having multiple battery cells, the second vehicle battery being configured to output electricity that has a second nominal voltage within a second nominal voltage range that is higher than the first nominal voltage range and that is used to supply electrical power to at least a second vehicle component;

a first switch coupled between the first vehicle battery and the first vehicle component, the first switch having an open state and a closed state;

a second switch coupled between a designated subset of battery cells and vehicle ground, the second switch having an open state and a closed state, and the designated subset of battery cells including one or more battery cells of the multiple battery cells of the second vehicle battery; and a third switch coupled between the designated subset of battery cells and the first vehicle component, the third switch having an open state and a closed state;

wherein the vehicle power supply backup system is configured so that when a backup condition of the first vehicle battery is detected, the first switch is changed to the open state, the second switch is changed to the closed state, and the third switch is changed to the closed state thereby causing the designated subset of battery cells to supply electricity having a third nominal voltage within the first nominal voltage range to at least the first vehicle component.

15. The system of claim 14, wherein the second switch is coupled between the vehicle ground and a negative terminal of a first one of the one or more battery cells of the designated subset of battery cells.

16. The system of claim 15, wherein the third switch is coupled between the designated subset of battery cells and a positive terminal of a second one of the one or more battery cells of the designated subset of battery cells.

17. The system of claim 16, wherein the one or more battery cells of the designated subset of battery cells include the first one of the battery cells, the second one of the battery cells, and at least one other battery cell that is connected in a serial fashion between the first one and the second one of the battery cells.

18. A method of providing backup power to an electrical component of a first vehicle electrical system, comprising the steps of:

detecting a backup condition of a first vehicle battery of the first vehicle electrical system; and in response to detecting the backup condition of the first vehicle battery, causing a second vehicle battery to provide electricity to the electrical component by:

changing a first switch from a closed state to an open state, wherein the first switch is provided along an electrical path between the first vehicle battery and the electrical component;

changing a second switch from an open state to a closed state, wherein the second switch is provided along an electrical path between a designated subset of battery cells and vehicle ground; and changing a third switch from an open state to a closed state, wherein the third switch is provided along an electrical path between the designated subset of battery cells and the electrical component.

19. The method of claim 18, wherein the changing the first switch step is carried out before the changing the second switch step.

20. The method of claim 19, wherein the backup condition of the first vehicle battery is a failure condition of the first vehicle battery.

* * * * *